(12) United States Patent
Hoover et al.

(10) Patent No.: US 11,890,673 B2
(45) Date of Patent: Feb. 6, 2024

(54) DROSS EXTRACTION SYSTEM AND METHODS THEREOF

(71) Applicant: Additive Technologies, LLC, Palm City, FL (US)

(72) Inventors: Linn C. Hoover, Webster, NY (US); Joseph C. Sheflin, Macedon, NY (US); Jason M. LeFevre, Penfield, NY (US); Seemit Praharaj, Webster, NY (US); David Alan Vankouwenberg, Avon, NY (US); Chu-Heng Liu, Penfield, NY (US); Douglas K. Herrmann, Webster, NY (US)

(73) Assignee: ADDITIVE TECHNOLOGIES, LLC, Palm City, FL (US)

( * ) Notice: Subject to any disclaimer, the term of this patent is extended or adjusted under 35 U.S.C. 154(b) by 113 days.

(21) Appl. No.: 17/374,762

(22) Filed: Jul. 13, 2021

(65) Prior Publication Data
US 2023/0015142 A1    Jan. 19, 2023

(51) Int. Cl.
*B22D 43/00*    (2006.01)
*B33Y 30/00*    (2015.01)
(Continued)

(52) U.S. Cl.
CPC ........... *B22D 43/00* (2013.01); *B22D 23/003* (2013.01); *B33Y 30/00* (2014.12); *B33Y 40/00* (2014.12); *B33Y 50/00* (2014.12)

(58) Field of Classification Search
CPC .......... B22F 10/22; B22F 10/85; B22F 12/50; B22F 12/00; B33Y 10/00; B33Y 30/00;
(Continued)

(56) References Cited

U.S. PATENT DOCUMENTS

| | | | | |
|---|---|---|---|---|
| 4,077,615 A | * | 3/1978 | Nagasaki | F27D 3/1572 266/201 |
| 5,305,990 A | * | 4/1994 | Sherwood | F27D 3/1572 266/205 |

(Continued)

FOREIGN PATENT DOCUMENTS

KR    20080032331    *    4/2008    ............. B22D 41/00

*Primary Examiner* — Jessee R Roe
*Assistant Examiner* — Michael Aboagye
(74) *Attorney, Agent, or Firm* — MH2 Technology Law Group LLP

(57) ABSTRACT

A dross extraction system for a printer is disclosed, which includes an ejector defining an inner cavity associated therewith, the inner cavity retaining a liquid printing material. The dross extraction system also includes a first inlet coupled to the inner cavity of the ejector, a probe external to the ejector, which is selectably positionable to contact the liquid printing material to attract dross thereto, thereby extracting dross from the liquid printing material when the probe is withdrawn from the liquid printing material. A method of extracting dross from a metal jetting printer is also disclosed, which includes pausing an operation of the metal jetting printer, advancing a probe into a melt pool within a nozzle pump reservoir in the metal jetting printer, extracting dross from the metal printing material and onto the probe, retracting the probe from the nozzle pump reservoir, and resuming the operation of the metal jetting printer.

13 Claims, 10 Drawing Sheets

(51) Int. Cl.
*B33Y 40/00* (2020.01)
*B33Y 50/00* (2015.01)
*B22D 23/00* (2006.01)

(58) Field of Classification Search
CPC ......... B33Y 40/00; B33Y 50/02; B33Y 50/00; B22D 23/003; B22D 43/00
USPC .............................. 222/590, 591, 593, 594
See application file for complete search history.

(56) References Cited

U.S. PATENT DOCUMENTS

| | | | |
|---|---|---|---|
| 6,187,257 B1 * | 2/2001 | Heine | C23C 2/003 266/205 |
| 10,315,247 B2 * | 6/2019 | Mark | B22F 10/22 |
| 11,473,842 B2 * | 10/2022 | Tamaki | F27D 3/1563 |
| 2009/0130014 A1 * | 5/2009 | Fukuyama | C01B 33/021 423/349 |
| 2022/0161330 A1 * | 5/2022 | Gibson | B33Y 40/00 |

* cited by examiner

DROSS EXTRACTION SYSTEM AND METHODS THEREOF

TECHNICAL FIELD

The present teachings relate generally to liquid ejectors in drop-on-demand (DOD) printing and, more particularly, to a dross extraction system and methods for use within a DOD printer.

BACKGROUND

A drop-on-demand (DOD) or three-dimensional (3D) printer builds (e.g., prints) a 3D object from a computer-aided design (CAD) model, usually by successively depositing material layer upon layer. A drop drop-on-demand (DOD), particularly one that prints a metal or metal alloy, ejects a small drop of liquid aluminum alloy when a firing pulse is applied. Using this technology, a 3D part can be created from aluminum or another alloy by ejecting a series of drops which bond together to form a continuous part. For example, a first layer may be deposited upon a substrate, and then a second layer may be deposited upon the first layer. One particular type of 3D printer is a magnetohydrodynamic (MHD) printer, which is suitable for jetting liquid metal layer upon layer to form a 3D metallic object. Magnetohydrodynamic refers to the study of the magnetic properties and the behavior of electrically conducting fluids.

In MHD printing, a liquid metal is jetted out through a nozzle of the 3D printer onto a substrate or onto a previously deposited layer of metal. A printhead used in such a printer is a single-nozzle head and includes several internal components within the head which may need periodic replacement. In some instances, a typical period for nozzle replacement may be an 8-hour interval. During the liquid metal printing process, the aluminum and alloys, and in particular, magnesium containing alloys, can form oxides and silicates during the melting process in the interior of the pump. These oxides and silicates are commonly referred to as dross. The buildup of dross is a function of pump throughput and builds continuously during the print process. In addition to being composed of a combination of aluminum and magnesium oxides and silicates, the dross may also include gas bubbles. Consequently, the density of the dross may be lower than that of the liquid metal printing material and builds at the top of the melt pool, eventually causing issues during printing. In addition, dross accumulation impacts the ability of internal level-sensing that measures the molten metal level of the pump. This can cause the pump to erroneously empty during printing, thereby ruining the part. Dross plugs may also grow within the pump causing issues with the pump dynamics resulting in poor jet quality and additional print defects, such as the formation of satellite drops during printing. The dross could potentially break apart and a chunk of this oxide falls into the nozzle resulting in a clogged nozzle. All of the aforementioned failures arising from dross accumulation are catastrophic, leading to printer shut down, requiring clearing or removal of the dross plug, replacing the print nozzle, and beginning start-up procedures again.

Thus, a method of and apparatus for removal or extraction of dross in a metal jet printing drop-on-demand or 3D printer is needed to provide longer printing times and higher throughput without interruption from defects or disadvantages associated with dross build-up.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A dross extraction system for a printer is disclosed. The dross extraction system includes an ejector defining an inner cavity associated therewith, the inner cavity retaining a liquid printing material. The dross extraction system also includes a first inlet coupled to the inner cavity of the ejector. The dross extraction system also includes a probe external to the ejector, selectably positionable to contact the liquid printing material to attract dross thereto, thereby extracting dross from the liquid printing material when the probe is withdrawn from the liquid printing material.

The dross extraction system for a metal jetting printer may also include a supply of printing material external to the ejector. The probe may further include a ceramic material. The probe is thermally stable at a temperature above 1000° C. The probe is inert in contact with the liquid printing material. The probe may include boron. The probe may include a textured surface. The dross extraction system for a metal jetting printer may include an inlet sleeve in communication with the inner cavity of the ejector. The dross extraction system for a metal-jetting printer may include an inert gas source coupled to the inlet sleeve. The dross extraction system for a metal jetting printer may include a motor coupled to the probe. The dross extraction system for a metal-jetting printer may include an optical sensor external to the ejector, configured to measure an external surface of the probe. The probe may be configured to be manually advanced into the inner cavity of the ejector. The probe further may include one or more radial protrusions, where each of the one or more radial protrusions include a proximal portion and a distal portion, where the proximal portion protrudes further from a center of the probe as compared to the distal portion.

Also disclosed is a printer having an ejector defining an inner cavity associated therewith, the inner cavity retaining liquid printing material. The printer further includes a first inlet coupled to the inner cavity and may include an inlet sleeve. The printer further includes a dross extraction system, which may include a probe external to the ejector, where the probe is configured to be automatically advanced and retracted into the inner cavity of the ejector, and an optical sensor external to the ejector, configured to measure an external surface of the probe.

A method of extracting dross from a metal jetting printer is also disclosed. The method of extracting dross also includes pausing an operation of the metal jetting printer. The method of extracting dross from a metal jetting printer also includes advancing a probe into a melt pool within a nozzle pump reservoir in the metal jetting printer, where the melt pool may include a metal printing material. The method of extracting dross from a metal jetting printer also includes extracting dross from a surface of the metal printing material and onto the probe, retracting the probe including the dross from the nozzle pump reservoir, and resuming the operation of the metal jetting printer. The method of extracting dross from a metal jetting printer may include introducing an inert gas into the nozzle pump reservoir via an inlet sleeve coupled to the nozzle pump reservoir. The method of extracting dross from a metal jetting printer may include rotating the probe. The method of extracting dross from a metal jetting printer may include measuring an external surface of the probe with an optical sensor. The method of extracting dross from a metal jetting printer may include discarding the probe including the dross after retracting the probe including the dross from the nozzle pump reservoir. The method of extracting dross from a metal jetting printer may include repeating any of the preceding operating steps.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

Figure 1:
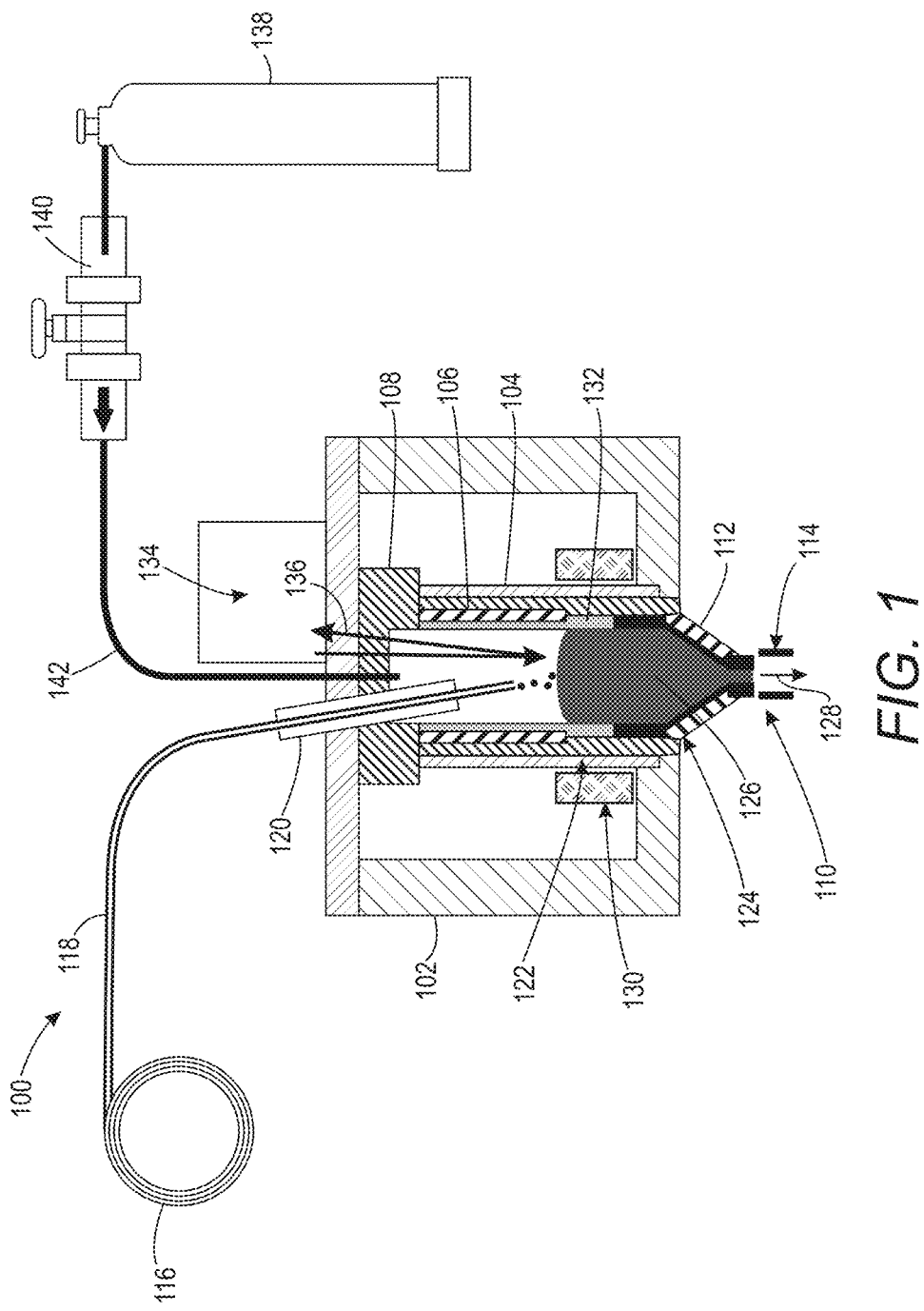
FIG. 1 depicts a schematic cross-sectional view of a single liquid ejector jet of a 3D printer (e.g., a MHD printer and/or multi jet printer), according to an embodiment.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

In drop-on-demand (DOD), metal jetting printing, or three-dimensional (3D) printing, a small drop of liquid aluminum or other metal or metal alloy are ejected when a firing pulse is applied. Using this printing technology, a 3D part can be created from aluminum or another alloy by ejecting a series of drops which bond together to form a continuous part. During a typical printing operation, the raw printing material wire feed can be replenished to the pump inside an ejector using a continuous roll of aluminum wire. The wire printing material may be fed into the pump using standard welding wire feed equipment or other means of introduction, such as a powder feed system. As printing occurs and new material is fed into the pump, a contaminant known as dross may accumulate in the top of the upper pump of the ejector. This build-up of dross is a function of the total throughput of printing material through the pump and ejector. As the dross contamination builds within the pump and/or ejector it eventually results in defects such as degraded jetting performance, nozzle or machine contamination, level sensor faults, additional printer maintenance, shut down, or contamination related catastrophic failure. While systems exist to counteract dross accumulation in similar ejector and printer systems, they are fairly complex and require manual operations involving multiple operators.

In embodiments described herein, a surface treated ceramic probe or boron probe is lowered into the dross floating at the top of the molten aluminum melt pool in the jetting crucible or pump in a printing system having a metal jetting liquid ejector. The surface treatment, or alternatively, the material of the probe itself enables the aluminum and dross to wet and adhere to the surface of the probe as it is lowered into and slowly withdrawn from the crucible. An optional spindle holding the probe may be enclosed within a sleeve so an inert gas source such as Argon can be directed over the probe to cool any metal and dross attached to the probe and solidify the metal in a manner that prevents it from falling off the probe as it is retracted, thus removing the dross from the liquid ejector pump. In certain embodiments the probes may be disposable and replaced between cleaning cycles. In other embodiments, the probe may be cleaned and re-used. The probe may be inserted and withdrawn or retracted manually, or in an automated, mechanical fashion. The material of the probe would not interfere with the electrical pulses used to jet the aluminum, so it could optionally be used during the jetting cycle, and without disrupting a printing operation. An optical sensor can be used to compare the increase in probe diameter as it is retracted from the crucible to the unused probe diameter to estimate the amount of dross removed. This information can be used to vary the frequency of the probe insertion based on the amount of dross recovered from each cleaning cycle.

FIG. 1 depicts a schematic cross-sectional view of a single liquid ejector jet of a 3D printer (e.g., a MHD printer and/or multi jet printer), according to an embodiment. FIG. 1 shows a portion of a type of drop-on-demand (DOD) or three-dimensional (3D) printer 100. The 3D printer or liquid ejector jet system 100 may include an ejector (also referred to as a body or pump chamber, or a "one-piece" pump) 104 within an outer ejector housing 102, also referred to as a lower block. The ejector 104 may define an inner volume 132 (also referred to as an internal cavity). A printing material 126 may be introduced into the inner volume 132 of the ejector 104. The printing material 126 may be or include a metal, a polymer, or the like. For example, the printing material 126 may be or include aluminum or aluminum alloy, introduced via a printing material supply 116 or spool of a printing material wire feed 118, in this case, an aluminum wire. The liquid ejector jet system 100 further includes a first inlet 120 within a pump cap or top cover portion 108 of the ejector 104 whereby the printing material wire feed 118 is introduced into the inner volume 132 of the ejector 104. The ejector 104 further defines a nozzle 110, an upper pump 122 area and a lower pump 124 area. One or more heating elements 112 are distributed around the pump chamber 104 to provide an elevated temperature source and maintain the printing material 126 in a molten state during printer operation. The heating elements 112 are configured to heat or melt the printing material wire feed 118, thereby changing the printing material wire feed 118 from a solid state to a liquid state (e.g., printing material 126) within the inner volume 132 of the ejector 104. The three-dimensional 3D printer 100 and ejector 104 may further include an air or argon shield 114 located near the nozzle 110, and a water coolant source 130 to further enable nozzle and/or ejector 104 temperature regulation. The liquid ejector jet system 100 further includes a level sensor 134 system which is configured to detect the level of molten printing material 126 inside the inner volume 132 of the ejector 104 by directing a detector beam 136 towards a surface of the printing material 126 inside the ejector 104 and reading the reflected detector beam 136 inside the level sensor 134.

The 3D printer 100 may also include a power source, not shown herein, and one or more metallic coils 106 enclosed in a pump heater that are wrapped at least partially around the ejector 104. The power source may be coupled to the coils 106 and configured to provide an electrical current to the coils 106. An increasing magnetic field caused by the coils 106 may cause an electromotive force within the ejector 104, that in turn causes an induced electrical current in the printing material 126. The magnetic field and the induced electrical current in the printing material 126 may create a radially inward force on the printing material 126, known as a Lorenz force. The Lorenz force creates a pressure at an inlet of a nozzle 110 of the ejector 104. The pressure causes the printing material 126 to be jetted through the nozzle 110 in the form of one or more liquid drops 128.

The 3D printer 100 may also include a substrate, not shown herein, that is positioned proximate to (e.g., below) the nozzle 110. The ejected drops 128 may land on the substrate and solidify to produce a 3D object. The 3D printer 100 may also include a substrate control motor that is configured to move the substrate while the drops 128 are being jetted through the nozzle 110, or during pauses between when the drops 128 are being jetted through the nozzle 110, to cause the 3D object to have the desired shape and size. The substrate control motor may be configured to move the substrate in one dimension (e.g., along an X axis), in two dimensions (e.g., along the X axis and a Y axis), or in three dimensions (e.g., along the X axis, the Y axis, and a Z axis). In another embodiment, the ejector 104 and/or the nozzle 110 may be also or instead be configured to move in one, two, or three dimensions. In other words, the substrate may be moved under a stationary nozzle 110, or the nozzle 110 may be moved above a stationary substrate. In yet another embodiment, there may be relative rotation between the nozzle 110 and the substrate around one or two additional axes, such that there is four or five axis position control. In certain embodiments, both the nozzle 110 and the substrate may move. For example, the substrate may move in X and Y directions, while the nozzle 110 moves up and/or down in a Y direction.

The 3D printer 100 may also include one or more gas-controlling devices, which may be or include a gas source 138. The gas source 138 may be configured to introduce a gas. The gas may be or include an inert gas, such as helium, neon, argon, krypton, and/or xenon. In another embodiment, the gas may be or include nitrogen. The gas may include less than about 10% oxygen, less than about 5% oxygen, or less than about 1% oxygen. In at least one embodiment, the gas may be introduced via a gas line 142 which includes a gas regulator 140 configured to regulate the flow or flow rate of one or more gases introduced into the three-dimensional 3D printer 100 from the gas source 138. For example, the gas may be introduced at a location that is above the nozzle 110 and/or the heating element 112. This may allow the gas (e.g., argon) to form a shroud/sheath around the nozzle 110, the drops 128, the 3D object, and/or the substrate to reduce/prevent the formation of oxide (e.g., aluminum oxide) in the form of an air shield 114. Controlling the temperature of the gas may also or instead help to control (e.g., minimize) the rate that the oxide formation occurs.

The liquid ejector jet system 100 may also include an enclosure 102 that defines an inner volume (also referred to as an atmosphere). In one embodiment, the enclosure 102 may be hermetically sealed. In another embodiment, the enclosure 102 may not be hermetically sealed. In one embodiment, the ejector 104, the heating elements 112, the power source, the coils, the substrate, additional system elements, or a combination thereof may be positioned at least partially within the enclosure 102. In another embodiment, the ejector 104, the heating elements 112, the power source, the coils, the substrate, additional system elements, or a combination thereof may be positioned at least partially outside of the enclosure 102.

Figure 2:
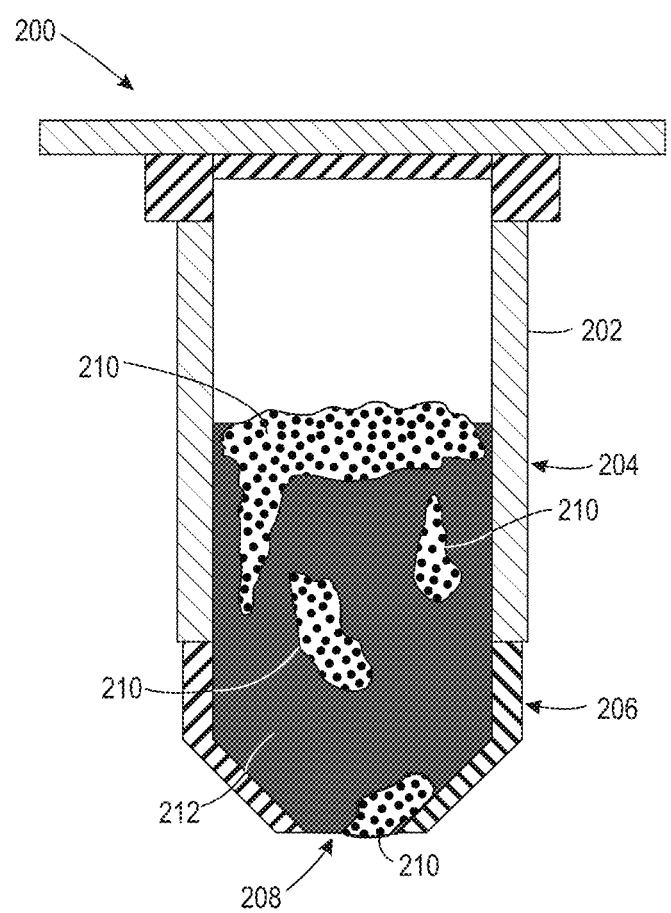
FIG. 2 is a side cross-sectional views of a liquid ejector jet contaminated with dross, according to an embodiment.

FIG. 2 is a side cross-sectional views of a liquid ejector jet contaminated with dross, according to an embodiment. The ejector 200 is shown, which further defines a cavity or outer wall 202 of the ejector, an upper pump area 204, a lower pump area 206, and an outlet nozzle 208. Within the inner cavity 202 of the outer wall 202 of the ejector 200 is further shown a molten printing material 212 and schematic of dross 210 build-up within and on top of the printing material 212. The dross 210, in certain embodiments, and dependent upon which printing material is used in the printing system, is a combination of aluminum oxides, magnesium oxides, and silicates. The dross 210 may also include gas bubbles. In certain embodiments, the dross 210, may include additional materials or contaminants, such as oxides and silicates of aluminum (Al), calcium (Ca), magnesium (Mg), silicon (Si), iron (Fe), or possibly other contaminants containing sodium (Na), potassium (K), sulfur (S), chlorine (Cl), carbon (C) or combinations thereof, The dross 210 typically builds towards the top of the melt pool that resides near the upper pump area 204 in the ejector 200 and may potentially cause issues during printing. Dross 210 accumulation may potentially impact the ability of the aforementioned level sensor that measures the molten metal level inside the ejector 200. An erroneous signal for the level sensor system can cause the pump to empty during printing, which could result in ruining the part being printed. One or more dross 210 "plugs" may also have a propensity to grow within the pump, which in turn may cause issues with the pump dynamics. Interruptions or issues in pump dynamics may further result in poor jet quality and the formation of satellite drops during printing. A satellite drop may refer to a drop with only a fraction of the volume of the main drop which can be unintentionally formed during the jetting of a main drop. For example, a physical occlusion at the nozzle is one potential cause resulting in the formation of a satellite drop. In certain embodiments or instances, the dross 210 could also potentially break apart, and a portion of this fragmented dross or oxide may fall into the nozzle 208 resulting in a clogged nozzle 208. Any failure arising from the accumulation of dross 210 has the tendency to be catastrophic, which could lead to necessitating a shut down of the printer, having to clear or remove the dross 210 plug, replacing the print nozzle, beginning start-up again, or combinations thereof.

Figure 3A:
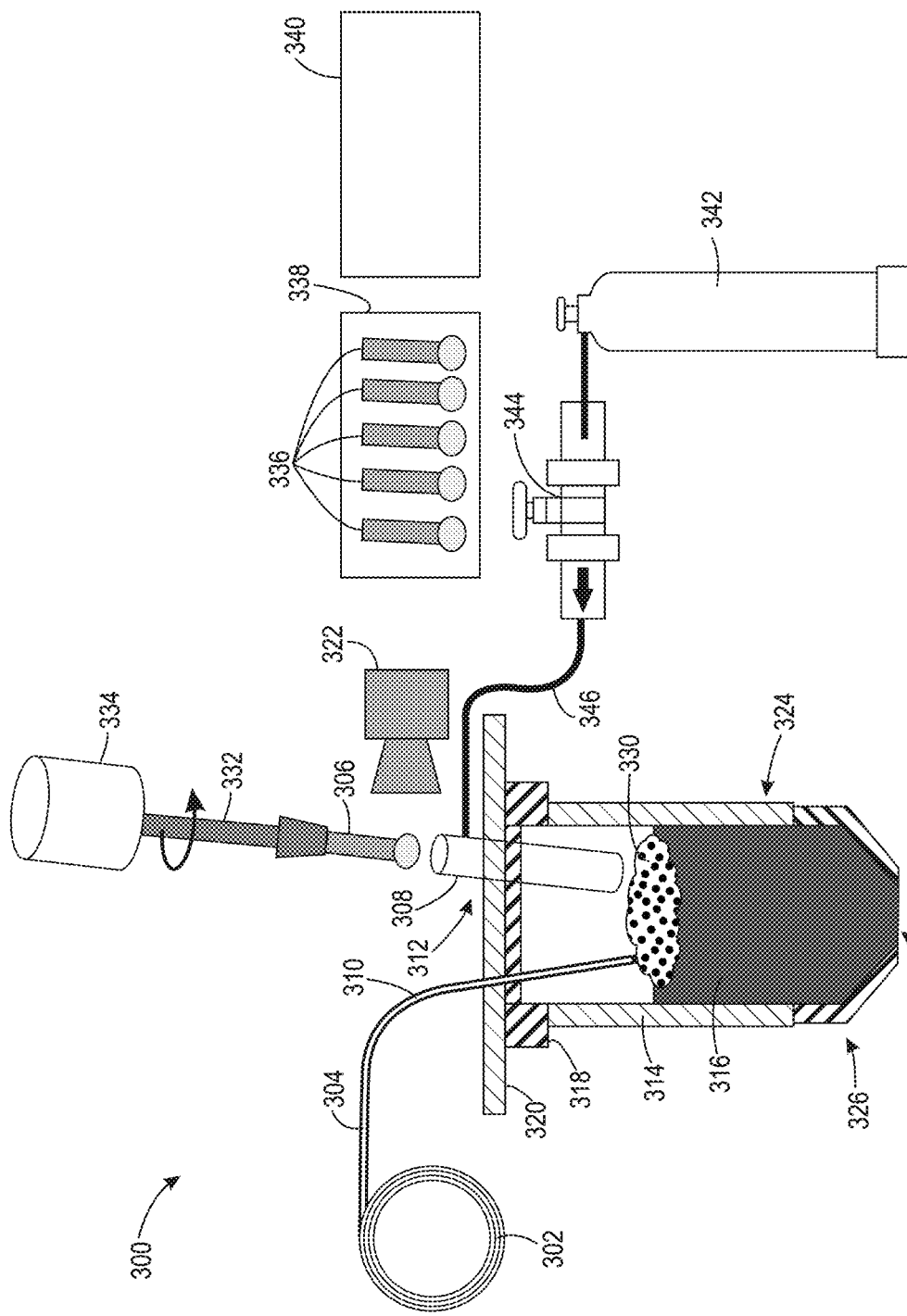
FIGS. 3A-3F are a series of side cross-sectional views of a single liquid ejector jet having a dross extraction system, illustrating operative steps of the dross abatement system, according to an embodiment.

FIGS. 3A-3F are a series of side cross-sectional views of a single liquid ejector jet with a dross extraction system, illustrating operative steps of the dross extraction system, according to an embodiment. FIG. 3A is a side cross-sectional view of a print head ejector or single liquid ejector jet, similar to the one illustrated in FIG. 1, with a dross extraction system, according to an embodiment. A liquid ejector jet with a dross abatement system 300 is shown, having a printing material supply 302 with a wire feed of printing material 304 shown external to an ejector 314. Certain embodiments may have the printing material supply 302 located internal to a housing that includes the ejector 314. Furthermore, alternate embodiments may include other means of introduction of printing material, such as a powder feed system or other printing material introduction means known to those skilled in the art. Example printing materials which could be ejected using a liquid ejector according to embodiments described herein also include alloys of aluminum, copper, iron, nickel, brasses, naval brass, and bronzes. Silver and alloys thereof, copper and alloys thereof, metallic alloys, braze alloys, or combinations thereof may also be printed using liquid ejectors according to embodiments herein.

Figure 5:
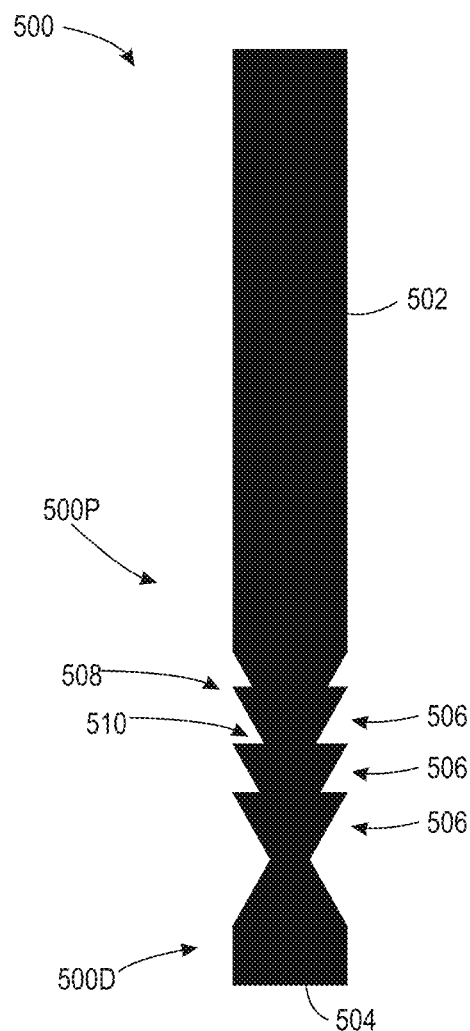
FIG. 5 is a cross-sectional schematic side view of an end of a dross extraction probe, according to an embodiment.

The liquid ejector jet with a dross abatement system 300 further includes an extraction probe 306 which is in part, a cylindrical rod having additional features such as a ball end or radial protrusions as described in regard to FIG. 5. The probe 306 may be introduced via an inlet sleeve 308 which is in communication with an internal volume or inner cavity of the ejector 314, which retains a liquid printing material. The probe 306 is selectably positionable to contact the liquid printing material to attract dross thereto, thereby extracting dross from the liquid printing material when the probe is withdrawn from the liquid printing material. Certain embodiments may have the probe 306 and associated apparatus located internal to the ejector 314 housing. Furthermore, alternate embodiments may include other means of introduction of probes, such as a manual probe introduction means known to those skilled in the art. Probe materials that are suitable for such high temperature applications such as those described herein include materials that are thermally stable at temperatures from about 850° C. to about 1600° C., chemically, magnetically, and physically inert in contact with printing materials or within the printing system. Suitable probe materials include graphite, boron, aluminum, boron nitride, aluminum oxide, aluminum nitride, zirconium oxide, or combinations thereof. Some probes may be surface treated by plasma treatment, corona treatment, surface coating, texturing, machining, or combinations thereof. A textured surface of the probe may be created by molding, sand blasting, sanding, powder coating, machining, or by other means known to those skilled in the art. The probe may be a 3-6 mm diameter probe, or alternatively, larger or smaller sized probes may be chosen for used based on a proportional size to the ejector size or the system throughput.

The ejector jet with a dross extraction system 300 of FIG. 3A also includes a first inlet 310 and a second inlet 312 at the top cover of the liquid ejector jet housing 320. The first inlet 310 and second inlet 312 allow access to the inner ejector cavity 314 for both the printing material 304 and the probe 306, respectively. The ejector jet with a dross extraction system 300 is in communication with and further defines a top portion 318 of the liquid ejector jet 300 an upper pump area 324, a lower pump area 326, and a nozzle 328. Within the ejector jet with a dross extraction system 300 is shown a quantity of molten printing material 316. The entire dross extraction system further includes an external motor 334 portion of the dross extraction system, which is configured to mechanically advance, retract, and rotate a spindle 332 which is coupled or attached to the probe 306. The probe 306 may be captured in a collet attached to the spindle 332, or by other means known to those skilled in the art. The movement of the motor may be user controlled or controlled by a system computer capable of running a program to initiate the dross extraction system commands, as well as adjust the parameters of the rotation speed, advancement speed or depth, retraction depth or speed, or frequency of dross extraction events based on feedback from sensors, measurement devices, or other subsystems within the printing system. A measurement device 322 is shown in proximity to the dross extraction system such that any accumulated dross on the probe 306 may be detected by the measurement device 322. The measurement device 322, which is configured to measure an external surface of the probe 306 may be based on a number of principles, for example, optical, laser, or distance measurement in order to evaluate the quantity of dross adhered onto an outer surface of the probe 306. A vision program may then compare the before and after dimensions of the probe 306 to estimate the amount of dross attached to the probe. This data can be used to adjust the dross extraction intervals.

Also shown in FIG. 3A is a storage area or cartridge for spare unused probes 338, holding a number of spare probes 336, as well as a storage area or cartridge to hold or store spare used probes 340. Coupled or attached to the inlet sleeve 308 is a gas line 346, which is attached to a gas source 342 containing an inert gas by way of a gas regulator 344 which may be used to regulate the flow of gas into the inlet sleeve 308. Thus, the gas source 342 may deliver a regulated flow of an inert gas to the inlet sleeve 308 to cool extracted dross and keep it adhered to the probe 306 and prevent further reaction with atmospheric gases as the dross is extracted from the ejector cavity 314. The gas further may provide a small amount of cooling to the liquid metal attached to the probe 306 surface, causing the surface to solidify and prevent the molten metal to drip off the probe 306 and back into the pump cavity 314.

Figure 3B:
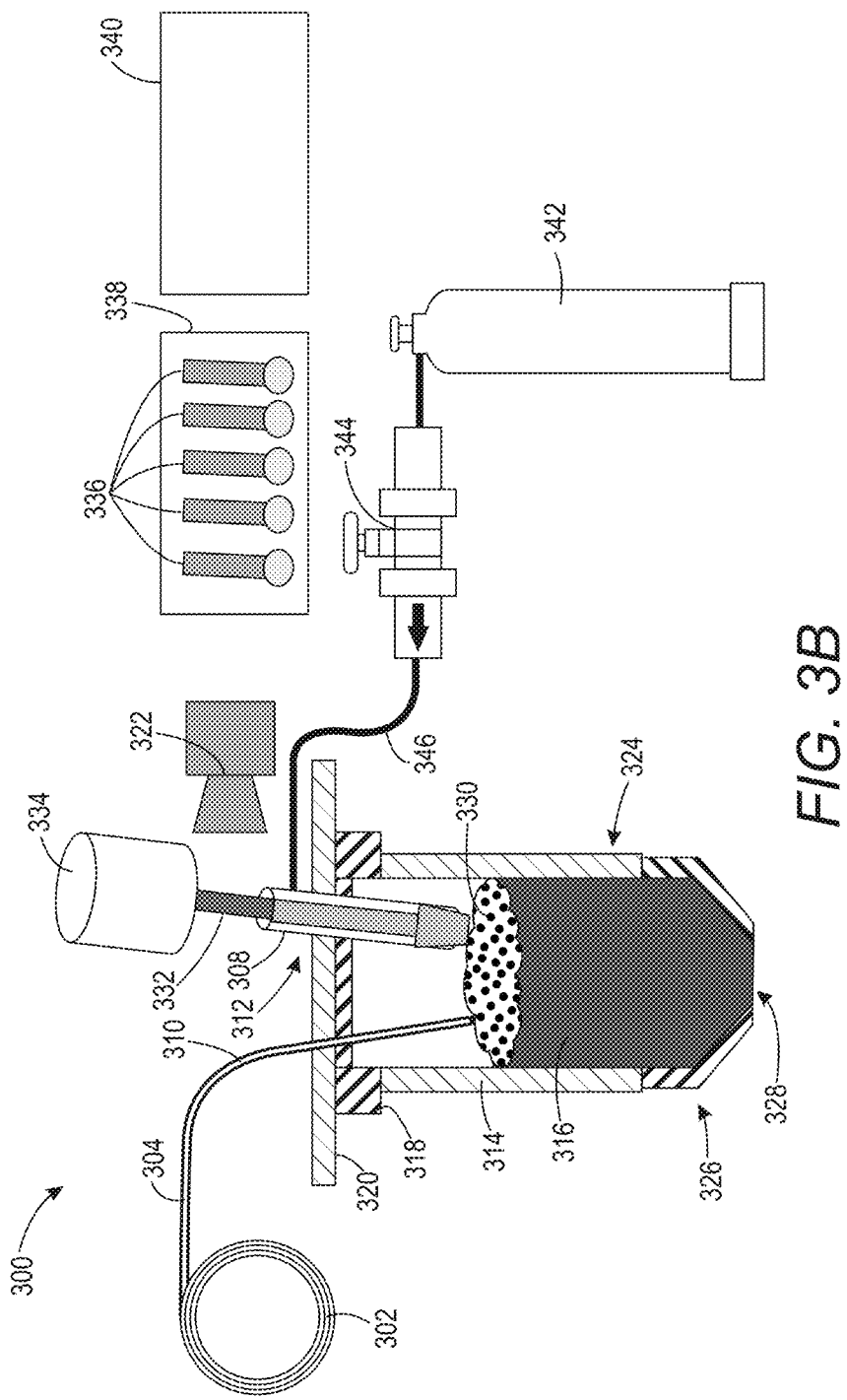

FIG. 3B illustrates a cross-sectional schematic of the ejector jet with a dross extraction system 300 having an accumulation of dross 330 inside the ejector cavity 314. The introduction of the probe 306 into the inner ejector cavity 314 and removal of the dross 330 may be periodically performed in-situ during the building of a part or other operation of the printing system including the ejector jet with a dross extraction system 300. At a point of sufficient dross 330 accumulation, or at the point of a predetermined service interval, the printer may intermittently pause to accommodate the dross 330 extraction operation. Prior to the introduction of the probe 306 into the inner ejector cavity 314, the measurement device 322 may perform a baseline measurement of the probe 306, for example to determine a diameter of the probe 306 prior to any dross extraction. Furthermore, at this point, an inert gas may be introduced into the inner sleeve 308 prior to dross extraction. The motor assembly 334 is raised and lowered to insert the probe into the inner cavity 314 where the tip of the probe 306 may be submerged approximately 4-5 mm into the molted aluminum, although other depths may be used depending on the amount of dross accumulated in the system. Once the probe 306 is lowered into the upper pump area 324 as shown, the probe 306 remains near or at the top of the melt pool of molten printing material 316 as does the accumulated dross 330, thereby allowing the dross 330 to adhere to the probe 306. At this time, the motor 334 may or may not be rotating the spindle 332 and therefore the probe 306 in order to facilitate dross 330 adherence to and extraction by the probe 306. The rotation enables the probe to thin and separate the dross layer as it penetrates the layer to minimize breaking the dross layer up and forcing dross fragments into the molten printing material. The rotation also maximizes the surface contact between the probe and dross.

Figure 3C:
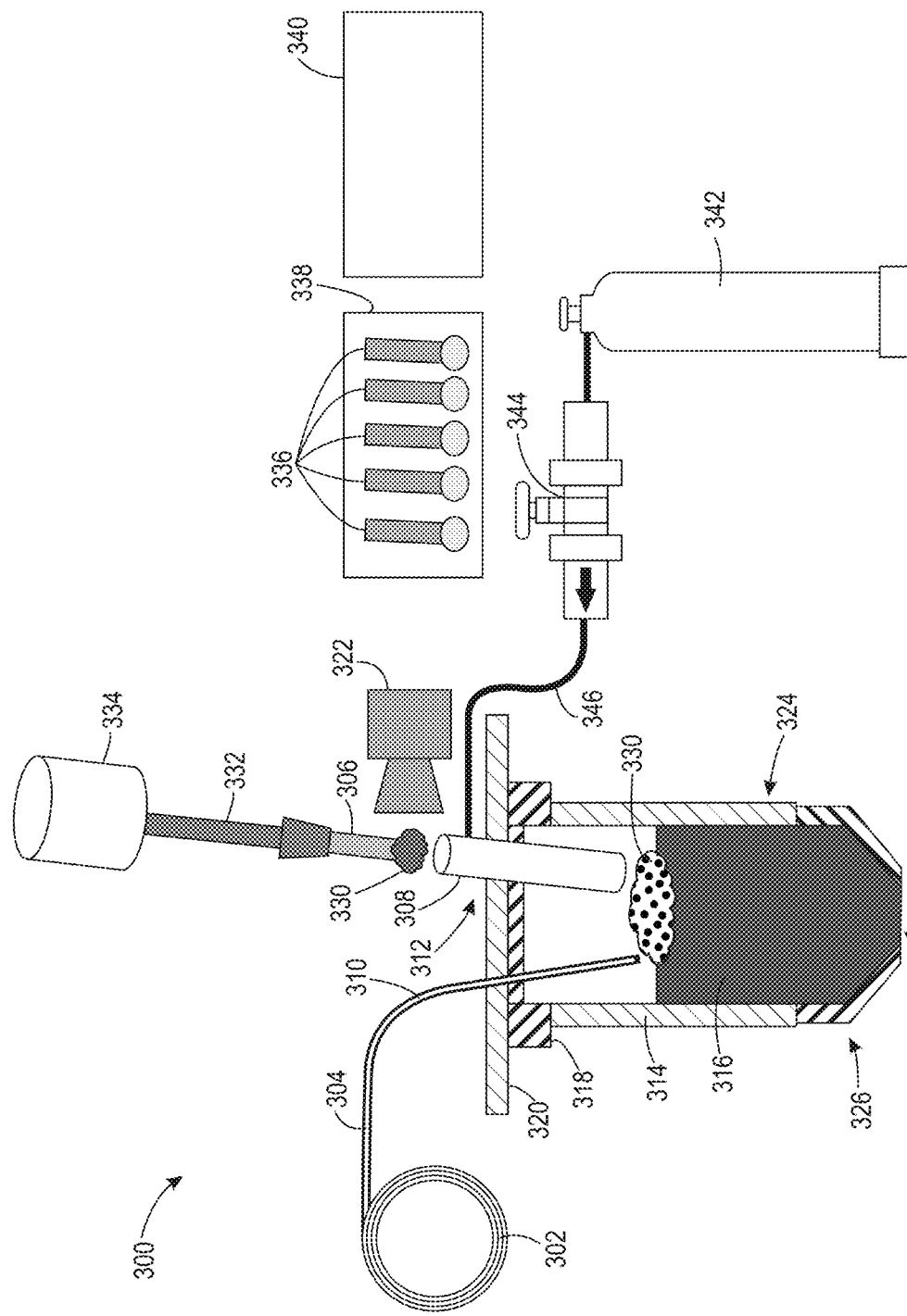

FIG. 3C illustrates the probe 306 being removed or extracted from the inner cavity 314 via the inlet sleeve 308 via the second inlet 312. The probe 306 may be lowered into the pump using either a dedicated inlet 312 and inlet sleeve 308 as shown or in certain embodiments by the same first inlet 310 that is currently used to feed the aluminum wire printing material 304 from the printing material supply 302. In the case of the first inlet 310 being used to introduce and advance the probe 306, the printing material 304 would be removed prior to the introduction of the probe 306 into the first inlet 310. Once the probe 306 with the accumulated dross 330 is removed from the inner cavity 314, the inert gas supply 342 may be shut off, and the measurement system 322 may optically measure the outer surface and/or diameter of the dross-laden probe 306. Alternatively, the gas supply 342 and/or the measurement system 322 may operate continuously throughout the procedure.

Figure 3D:
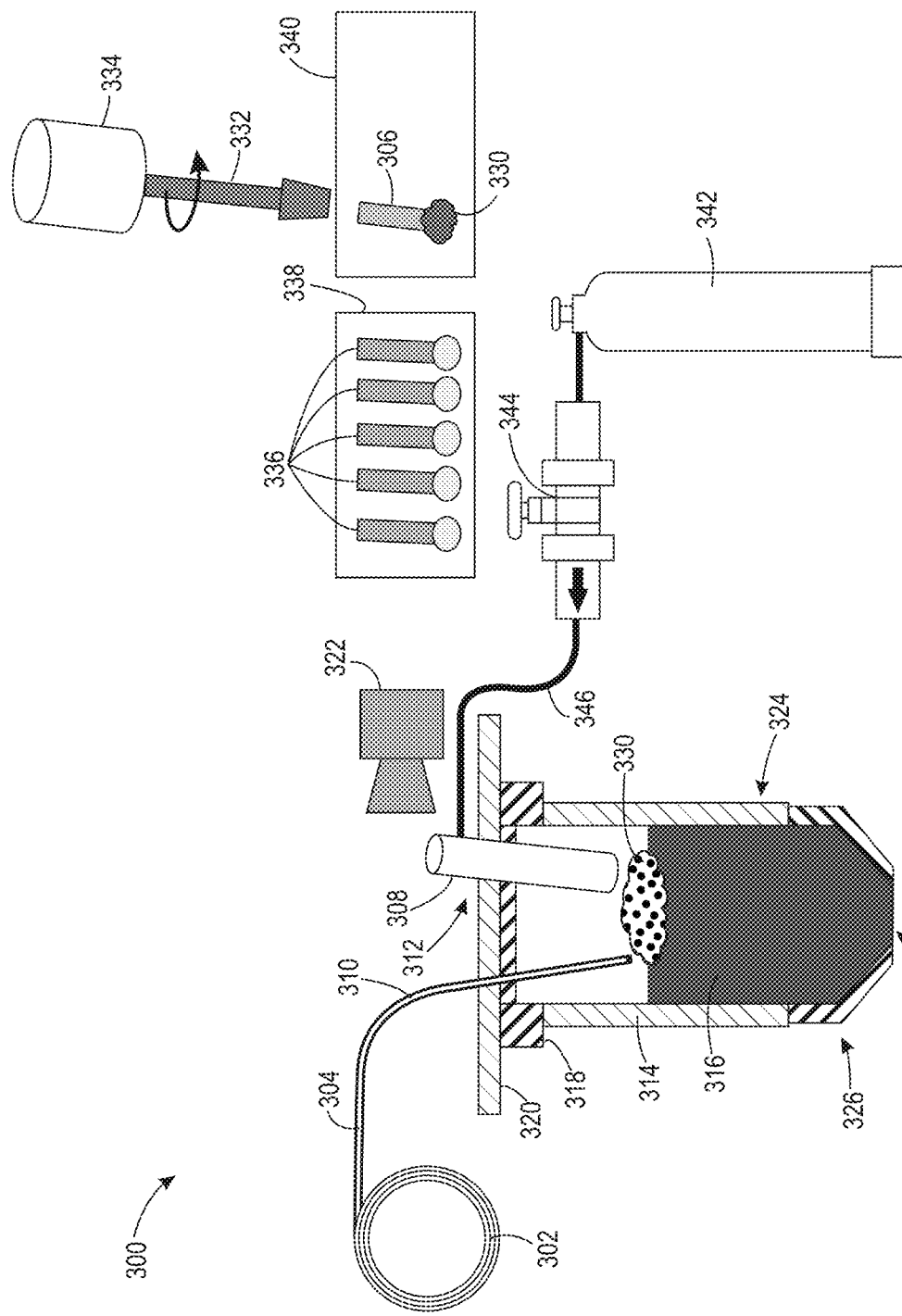
Figure 3E:
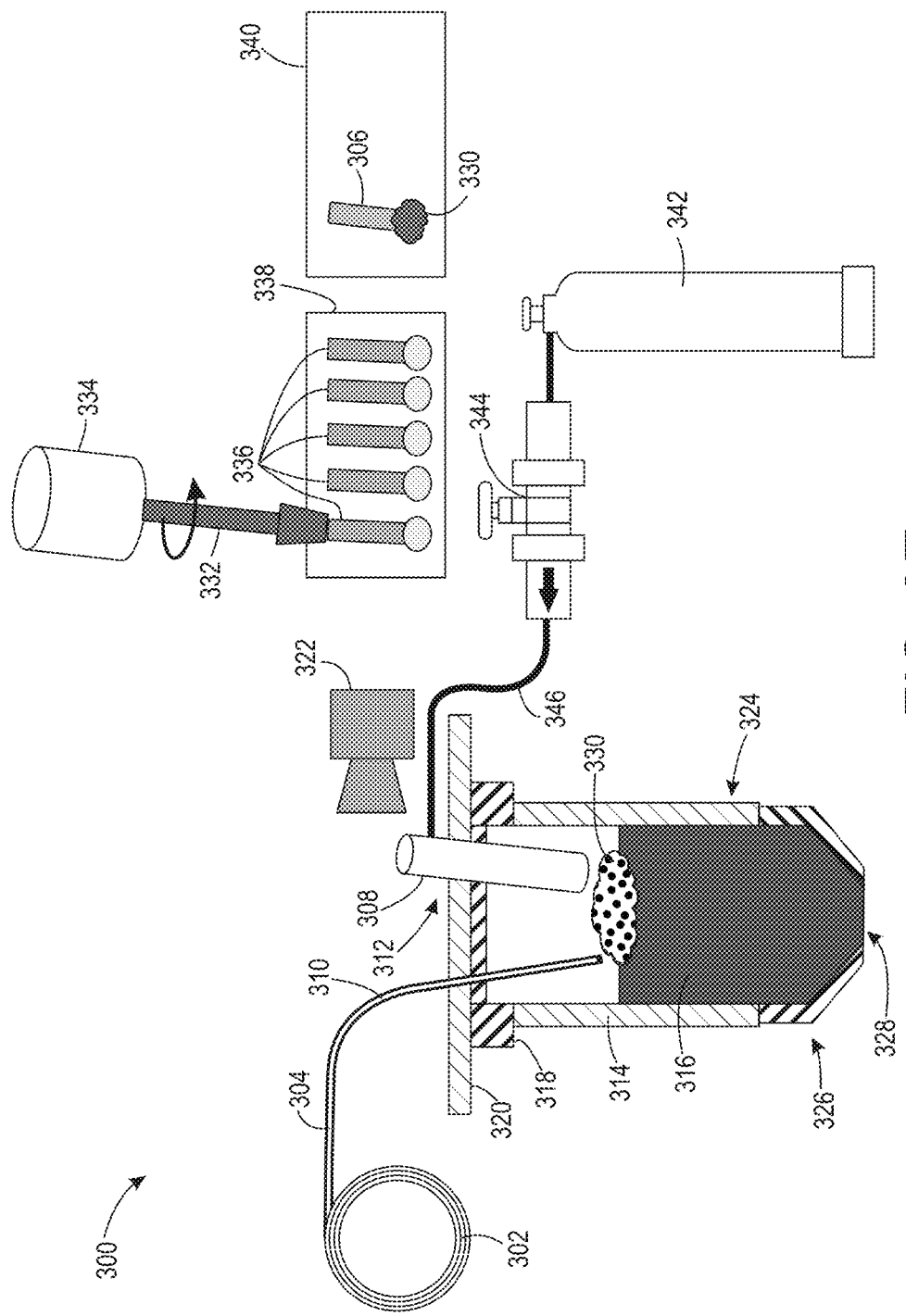

FIG. 3D illustrates a step in the dross extraction showing the dross 330, now adhered onto the probe 306 as the probe 306 is retracted back out of the ejector cavity 314 of the ejector jet 300 via the second inlet 312 and inlet sleeve 308. In certain embodiments, the first inlet 310 that is used to feed the aluminum wire printing material 304 from the printing material supply 302 may be used for advancement and retraction of the probe 306. The dross-coated probe 306 can either be discarded, or alternatively cleaned to remove the collected dross 330 from the probe 306 to enable reuse of the probe 306. In certain embodiments, the probe 306 may be reused by removing collected dross with a chemical treatment, such as a strong acid, to remove the dross and reuse the probe 306 in an offline or external procedure at room temperature. In these embodiments, it may be beneficial to isolate these operations away from the pump rather than risk contamination to the ejector or the printing system. The motor 334 and associated assembly then translates to a position near the storage area or cartridge used to hold or store spare used probes 340, and the spindle 332 releases the probe 306 to deposit the used probe 306 into the storage area or cartridge to hold or store spare used probes 340. FIG. 3E illustrates a subsequent step in the dross extraction procedure, showing the motor 334 and spindle 332 picking up or engaging a fresh, unused probe 336 from the storage area or cartridge for spare unused probes 338.

Figure 3F:
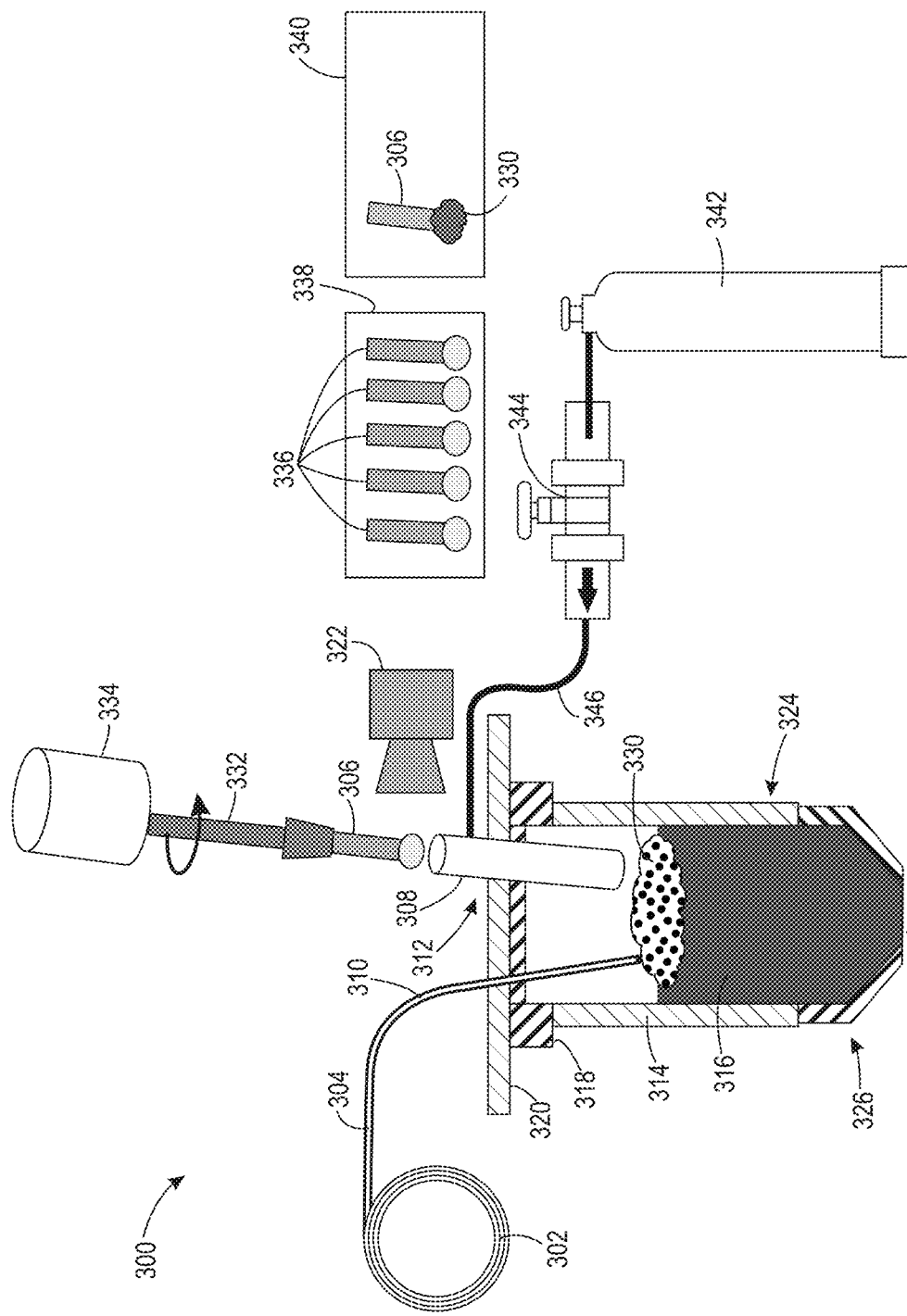

At this stage, the printing material 304 may be fed back into the ejector cavity 314 of the ejector jet 300 and printing operations or part build can be resumed. This stage of being ready to re-use or re-deploy the ejector jet including a dross extraction system and the new or refreshed probe 306 is represented in FIG. 3F. Thus, the dross removal can occur during the part print job and the print job can continue once the dross is removed from the system. It should be noted that alternate embodiments of a dross extraction system for a liquid metal ejector as shown herein may include alternate means of introducing a probe into an ejector jet to remove accumulated dross may be employed as well. This may include manual introduction and removal of a probe into and out from an ejector jet, such by an operator.

Advantages of such an in-process dross extraction system include higher printing throughput, reduced downtime for cleaning or catastrophic failures related to dross accumulation, extended print run time, larger part builds, and increased printing system productivity. Additional system advantages include improved jetting performance, improved measurement and control of the level of the melt pool inside the ejector jet, enablement of printing system running at higher pump temperatures for improved jet quality, and improved component life, particularly the life of the upper pump of the ejector.

Figure 4:
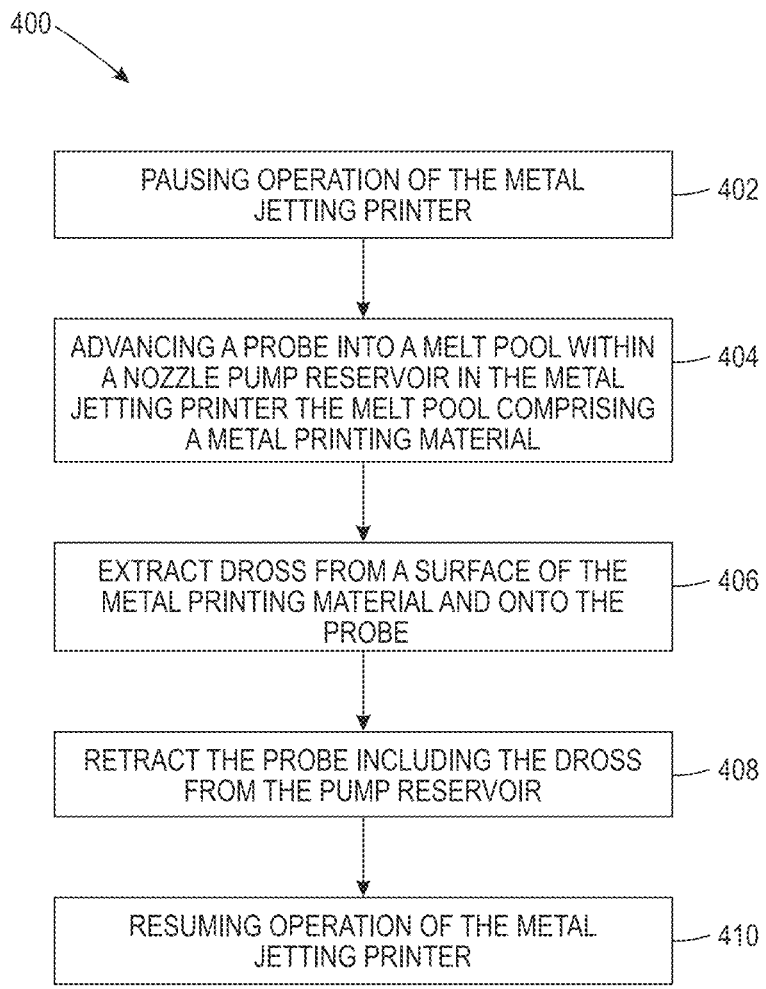
FIG. 4 is a flowchart illustrating a method of extracting dross in a metal jetting printer, according to an embodiment.

FIG. 4 is a flowchart illustrating a method of extracting dross from a metal jetting printer, according to an embodiment. A method of extracting dross from a metal jetting printer 400 is illustrated, which includes a step of pausing an operation of the metal jetting printer 402. While a metal jetting printer, or MHD drop-on-demand printer is printing, or the printer is in progress with respect to a normal printing operation, the printer may be paused. In certain embodiments, this pausing may be executed manually or automatically, either at a pre-determined operation interval or initiated by an external factor, such as a level sensor detecting an interrupted or anomalous reading, an observed printing defect, an inefficient jetting operation, or other atypical reading within the metal jetting printing system. Next, the method of dross extraction 400 includes advancing a probe into a melt pool within a nozzle pump reservoir in the metal jetting printer, the melt pool comprising a metal printing material 404. In certain embodiments, the probe may be advanced into the same inlet or entrance into the liquid ejector into which the printing material is introduced. The method of dross extraction 400 may also include introducing an inert gas into the nozzle pump reservoir via an inlet sleeve coupled to the nozzle pump reservoir during any of the steps described in the method. The introduction of the inert gas via the inlet sleeve serves the purpose of either cooling the surface of the extracted dross to insure it stays adhered to the external surface of the probe, or preventing it from sloughing off of the probe or falling back into the melt pool in the nozzle pump reservoir, according to an embodiment. Certain embodiments of the method of dross extraction 400 may utilize a motor attached to the probe used to rotate the probe during any portion of the method of dross extraction. In certain embodiments, the motor may rotate the probe continuously, or may rotate intermittently depending upon in which portion of the method the probe is currently involved. absorbent material made from a continuous filament. Other embodiments may further include an absorbent material such as a mineral wool. Certain embodiments of the method of dross extraction 400 may include dross material which is made of a silicate or an oxide of the metal or metal alloys included in the printing material.

The method of dross extraction 400 further includes extracting dross from a surface of the metal printing material and onto the probe 406. As the liquid printing material resides in the melt pool, dross accumulation may occur, as described previously. This dross contamination typically resides on the surface of the melt pool, and thus the probe material need only be in contact with the molten surface of the melt pool, such that it absorbs the dross material from the remaining liquid or molten metal within the melt pool held in the inner cavity of the pump in the liquid metal ejector. In certain embodiments, the probe may reside for a period of time at the surface of the melt pool, or be advanced under the surface of the melt pool for a predetermined length of time in order to absorb a sufficient quantity of dross to prevent detrimental pump and ejector operation. The method of dross extraction 400 includes a subsequent step of retracting the probe including the dross from the pump reservoir 408. As shown previously in regard to FIGS. 3A-3F, the probe is removed or retracted from the inner cavity of the pump in the ejector, thereby removing the dross that is absorbed onto an external surface of the probe. In certain embodiments, after removing the probe, which includes the dross, the probe which includes the dross after removing the dross and probe from the ejector pump reservoir is discarded. In other embodiments, the probe which includes the dross after removing the dross and probe from the ejector has the dross cleaned or removed from the probe. Still other embodiments may include a step of reusing the probe after the step of removing the probe from the pump reservoir and/or cleaning the probe. The probe need not be cleaned or discarded after only one cycle of dross extraction as described previously. An external surface of the probe may be measured by an external optical sensor to determine an amount of dross adhered to the surface of the probe. Thus, an upper threshold of a quantity of dross could be derived via the optical measurement to determine if subsequent cycles of extraction could be performed prior to a step of discarding or cleaning the probe from extracted dross. Finally, the method of dross extraction 400 further includes resuming the operation of the metal jetting printer 410. According to certain embodiments, the method of extracting dross 400 from a metal jetting printer may further include repeating any or all of the steps of the method as previously described or at any specified interval.

FIG. 5 is a cross-sectional schematic side view of an end of a dross extraction probe, according to an embodiment. A cross-sectional side view of an end of a ceramic rod or dross extraction probe 500 in FIG. 5 defines a shaft 502 portion and the exemplary probe 500 defines a proximal end 500P which is the end which would be considered closer or towards the main dross extraction apparatus and a distal end 500D which would be towards the end of the probe 500 to be first immersed in the melt pool of the liquid ejector to extract any accumulated dross within the melt pool of the inner cavity of the liquid ejector. The probe 500 further defines a probe end 504 at the distal end of the probe. This probe end 504 has a rectangular end as shown, but in alternate embodiments may have a rounded, triangular shape, or other shapes configured to physically anchor loose dross within an inner cavity melt pool of printing material in a liquid ejector. The probe also defines several ribs or radial protrusions 506 located towards the distal end 500D of the probe 500. These radial protrusions 506 are spaced substantially evenly apart from one another, and each protrusion 506 further defines a larger diameter portion 508 of the radial protrusion 506 and a smaller diameter section 510 of radial protrusion. Each individual smaller diameter section 510 of each protrusion 506 is positioned more towards the distal end 500D of the probe 500 as compared to each individual larger diameter portion 508 of each radial protrusion 506. Likewise, each individual larger diameter portion 508 of each protrusion 506 is positioned more towards the proximal end 500P of the probe 500 as compared to each individual smaller diameter section 510 of each radial protrusion 506. This results in a triangular-like shape as viewed from a side view as illustrated in FIG. 5, wherein the proximal portion protrudes further from a center of the probe as compared to the distal portion of the radial protrusion. Alternate embodiments of extraction probes as disclosed herein may have different radial protrusion configurations and may not be triangular as viewed from a side view, and may be rectangular, rounded, triangular, or combinations thereof. The rib protrusion shape and dimensions and orientations from a central shaft portion of the probe are optimally configured to pick up, adhere and remove dross from a molten printing material melt pool of a liquid ejector, while either used manually, in an automated fashion, or used either while stationary or rotated, in certain embodiments. Probe shapes may have ball ends, spherical protrusions, spike-like, conical protrusions, or rod-like protrusions. The purpose of the probe protrusions is to increase surface area of the probe surface to enhance or maximize dross pick up and extraction. Probe materials are ideally electrically and magnetically inert to allow the probes, and therefore the extraction methods described herein, to be used while the liquid metal pump is operating without interference to the pump operation. Probes and probe materials may alternatively be surface treated, for example, by corona treatment, externally coated, anodized, sealed, plasma-treated, ion-implanted, or a combination thereof in order to enhance the wetting of the surface of the probe in contact with the metal or metal alloy used as a printing material. Probes may be permanent, cleaned and re-used or may alternately be discarded after use when sufficient quantities of dross have been extracted and adhered to each probe.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A dross extraction system for a metal-jetting printer, comprising: an ejector defining an inner cavity associated therewith, the inner cavity retaining a liquid printing material; a first inlet coupled to the inner cavity configured to introduce printing material into the inner cavity of the ejector; a second inlet coupled to the inner cavity further comprising an inlet sleeve; and a probe external to the ejector, selectably positionable within the inlet sleeve to contact the liquid printing material to attract dross thereto, thereby extracting dross from the liquid printing material when the probe is withdrawn from the liquid printing material via the inlet sleeve.

2. The dross extraction system for a metal-jetting printer of claim 1, further comprising a supply of printing material external to the ejector.

3. The dross extraction system for a metal jetting printer of claim 1, wherein the probe further comprises a ceramic material.

4. The dross extraction system for a metal jetting printer of claim 1, wherein the probe is thermally stable at a temperature above 1000° C.

5. The dross extraction system for a metal jetting printer of claim 1, wherein the probe is inert in contact with the liquid printing material.

6. The dross extraction system for a metal jetting printer of claim 1, wherein the probe comprises boron.

7. The dross extraction system for a metal jetting printer of claim 1, wherein the probe comprises a textured surface.

8. The dross extraction system for a metal-jetting printer of claim 1, further comprising an inert gas source coupled to the inlet sleeve.

9. The dross extraction system for a metal-jetting printer of claim 1, further comprising a motor coupled to the probe.

10. The dross extraction system for a metal-jetting printer of claim 1, further comprising an optical sensor external to the ejector, configured to measure an external surface of the probe.

11. The dross extraction system for a metal jetting printer of claim 1, wherein the probe is configured to be manually advanced into the inner cavity of the ejector.

12. The dross extraction system for a metal jetting printer of claim 1, wherein the probe further comprises one or more radial protrusions, wherein each of the one or more radial protrusions comprises a proximal portion and a distal portion, wherein the proximal portion protrudes further from a center of the probe as compared to the distal portion.

13. A printer, comprising: an ejector defining an inner cavity associated therewith, the inner cavity retaining liquid printing material; a first inlet coupled to the inner cavity configured to introduce printing material into the inner cavity of the ejector; a second inlet couple to the inner cavity, further comprising an inlet sleeve; and a dross extraction system, comprising: a probe external to the ejector; wherein the probe is configured to be automatically advanced and retracted into the inner cavity of the ejector via the inlet sleeve; and an optical sensor external to the ejector, configured to measure an external surface of the probe.

* * * * *